United States Patent
Fukui et al.

(10) Patent No.: US 12,340,955 B2
(45) Date of Patent: Jun. 24, 2025

(54) SOLID ELECTROLYTIC CAPACITOR ELEMENT HAVING IMPROVED THERMAL STABILITY, AND SOLID ELECTROLYTIC CAPACITOR AND METHOD FOR MANUFACTURING SAME

(71) Applicant: Panasonic Intellectual Property Management Co., Ltd., Osaka (JP)

(72) Inventors: Hitoshi Fukui, Saga (JP); Makoto Nagashima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 224 days.

(21) Appl. No.: 18/001,679

(22) PCT Filed: Jul. 2, 2021

(86) PCT No.: PCT/JP2021/025153
§ 371 (c)(1),
(2) Date: Dec. 13, 2022

(87) PCT Pub. No.: WO2022/009800
PCT Pub. Date: Jan. 13, 2022

(65) Prior Publication Data
US 2023/0223203 A1    Jul. 13, 2023

(30) Foreign Application Priority Data
Jul. 7, 2020 (JP) .................................. 2020-117402

(51) Int. Cl.
*H01G 9/048* (2006.01)
*H01G 9/00* (2006.01)
*H01G 9/15* (2006.01)

(52) U.S. Cl.
CPC ........... *H01G 9/048* (2013.01); *H01G 9/0032* (2013.01); *H01G 9/0036* (2013.01); *H01G 9/15* (2013.01)

(58) Field of Classification Search
CPC .... H01G 9/048; H01G 9/0032; H01G 9/0036; H01G 9/15; H01G 9/0425; H01G 9/0029; H01G 9/04; H01G 9/07; H01G 9/052
See application file for complete search history.

(56) References Cited

U.S. PATENT DOCUMENTS 3,345,545 A * 10/1967 Bourgault .............. H01G 9/052
361/529
5,949,639 A * 9/1999 Maeda ................... H01G 9/052
361/523

(Continued)

FOREIGN PATENT DOCUMENTS

CN 111009419 A * 4/2020 ............. H01G 9/045
JP 59-132629 U 9/1984

(Continued)

OTHER PUBLICATIONS

International Search Report of PCT application No. PCT/JP2021/025153 dated Sep. 21, 2021.

*Primary Examiner* — Nathan Milakovich
*Assistant Examiner* — Daniel M Dubuisson
(74) *Attorney, Agent, or Firm* — Rimon P.C.

(57) ABSTRACT

A solid electrolytic capacitor element includes an anode body that includes a porous part in at least a surface layer of the anode body, a dielectric layer, and a cathode part. The cathode part includes a solid electrolyte layer that covers the at least a part of the dielectric layer. The anode body includes a first part and a second part. The first part is a cathode forming part on which the solid electrolyte layer is formed, and the second part is a part on which the solid electrolyte layer is not formed. The second part includes at least an (Continued)

anode part including an end of the anode body opposite to the first part. The first part is sectionalized into a plurality of regions, and the first part has a groove at a boundary between adjacent regions among the plurality of regions.

13 Claims, 4 Drawing Sheets

(56) References Cited

U.S. PATENT DOCUMENTS

| | | | | |
|---|---|---|---|---|
| 7,154,742 | B1* | 12/2006 | Hahn | H01G 9/052 |
| | | | | 29/25.03 |
| 2004/0150942 | A1* | 8/2004 | Yoshida | H01G 9/15 |
| | | | | 361/523 |
| 2005/0122663 | A1* | 6/2005 | Poltorak | H01G 9/15 |
| | | | | 361/528 |
| 2005/0162814 | A1 | 7/2005 | Maruko et al. | |
| 2005/0270725 | A1* | 12/2005 | Hahn | H01G 9/012 |
| | | | | 361/533 |
| 2009/0080144 | A1* | 3/2009 | Matumoto | H01G 11/48 |
| | | | | 29/25.03 |
| 2010/0110615 | A1* | 5/2010 | Nishimura | H01G 9/012 |
| | | | | 29/25.03 |
| 2014/0104757 | A1* | 4/2014 | Candeias | H01G 9/012 |
| | | | | 361/523 |
| 2014/0233157 | A1* | 8/2014 | Hahn | H01G 9/0425 |
| | | | | 361/528 |
| 2014/0321029 | A1* | 10/2014 | Djebara | H01G 9/0425 |
| | | | | 361/528 |
| 2017/0018368 | A1* | 1/2017 | Ito | H01G 9/042 |
| 2018/0158610 | A1* | 6/2018 | Inoue | H01G 4/33 |
| 2020/0365333 | A1* | 11/2020 | Djebara | H01G 9/048 |

FOREIGN PATENT DOCUMENTS

| | | | |
|---|---|---|---|
| JP | 2005-216929 | | 8/2005 |
| JP | 2007311531 | A * | 11/2007 |
| JP | 2008-186842 | | 8/2008 |
| JP | 2013153024 | A * | 8/2013 |

* cited by examiner

SOLID ELECTROLYTIC CAPACITOR ELEMENT HAVING IMPROVED THERMAL STABILITY, AND SOLID ELECTROLYTIC CAPACITOR AND METHOD FOR MANUFACTURING SAME

CROSS-REFERENCE TO RELATED APPLICATIONS

This application is a U.S. national stage application of the PCT International Application No. PCT/JP2021/025153 filed on Jul. 2, 2021, which claims the benefit of foreign priority of Japanese patent application No. 2020-117402 filed on Jul. 7, 2020, the contents all of which are incorporated herein by reference.

TECHNICAL FIELD

The present disclosure relates to a solid electrolytic capacitor element, a solid electrolytic capacitor including a solid electrolytic capacitor element, and a method for manufacturing a solid electrolytic capacitor.

BACKGROUND

A solid electrolytic capacitor includes a capacitor element including a solid electrolyte layer, an electrode terminal electrically connected to the capacitor element, and an exterior body sealing the capacitor element. The capacitor element includes, for example, an anode foil including a porous part in a surface layer, a dielectric layer formed on at least a part of a surface of the anode foil, a solid electrolyte layer covering at least a part of the dielectric layer, and a cathode lead-out layer covering at least a part of the solid electrolyte layer.

Unexamined Japanese Patent Publication No. 2005-216929 discloses a surface-mounted thin-type capacitor using, as base materials, a metal foil including a metal core wire and an etched layer covering both surfaces of the metal core wire. In the surface-mounted thin-type capacitor, both ends of the metal foil are used as anodes, and a cathode is formed on a surface of a central part of the metal foil. The surface-mounted thin-type capacitor includes a resist resin formed at a boundary between the anode and the cathode, and a conductive polymer layer formed by polymerization of a conductive polymer inside and on a surface of the etched layer at the central part of the metal foil. In the surface-mounted thin-type capacitor in which the cathode is formed on a surface of the conductive polymer layer, and the resist resin is formed to block the etched layer on the anode side and the conductive polymer layer.

SUMMARY

A solid electrolytic capacitor element according to a first aspect of the present disclosure includes an anode body that includes a porous part in at least a surface layer of the anode body, a dielectric layer that is disposed on at least a part of a surface of the anode body, and a cathode part that covers at least a part of the dielectric layer. The cathode part includes a solid electrolyte layer that covers the at least a part of the dielectric layer. The anode body includes a first part and a second part. The first part is a cathode forming part on which the solid electrolyte layer is formed, and the second part is a part on which the solid electrolyte layer is not formed. The second part includes at least an anode part including an end of the anode body opposite to the first part. The first part is sectionalized into a plurality of regions, and the first part has a groove is present at a boundary between the plurality of adjacent regions among the plurality of regions.

A solid electrolytic capacitor according to another aspect of the present disclosure includes at least one solid electrolytic capacitor element described above.

A method for manufacturing a solid electrolytic capacitor element according to still another aspect of the present disclosure includes (i) preparing an anode body that includes a porous part in at least a surface layer of the anode body, the anode body including a first part that is a cathode forming part and a second part that includes at least an anode part including an end opposite to the first part, (ii) forming a dielectric layer on at least a part of a surface of the anode body, (iii) forming a groove in the first part of the anode body and sectionalizing the first part into a plurality of regions, and (iv) covering at least a part of the dielectric layer in the first part with a solid electrolyte layer.

According to the present disclosure, it is possible to provide a solid electrolytic capacitor element having excellent thermal stability and a solid electrolytic capacitor including the solid electrolytic capacitor element.

DESCRIPTION OF EMBODIMENT

Figure 1:
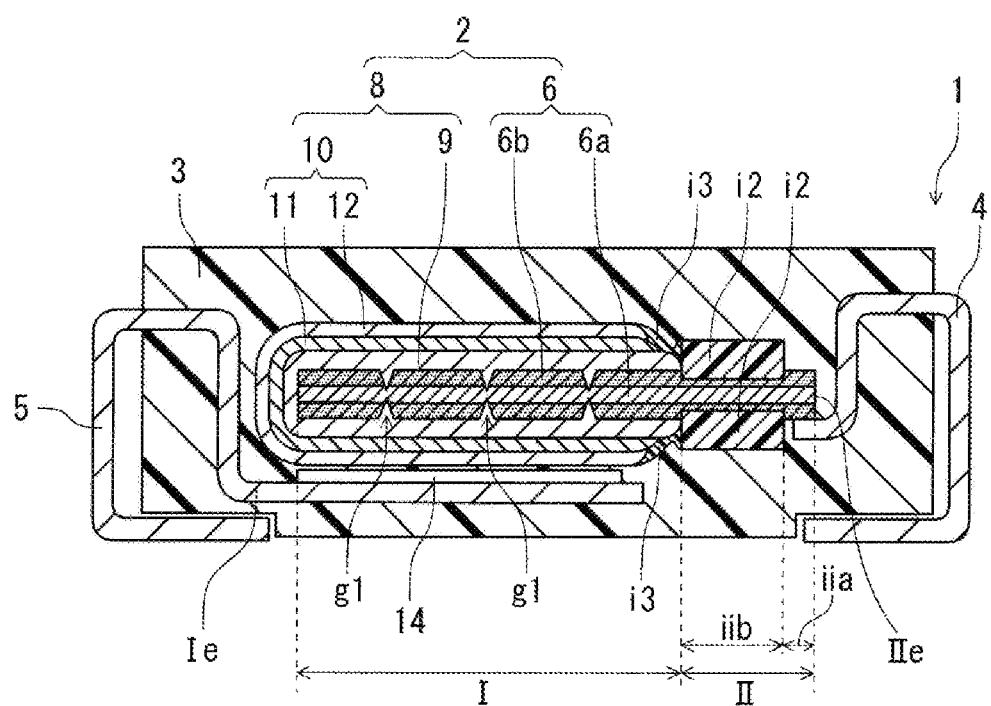
FIG. 1 is a cross-sectional view schematically illustrating a solid electrolytic capacitor according to a first exemplary embodiment of the present disclosure.

Prior to the description of an exemplary embodiment, a problem in the prior art will be briefly described below.

For example, an anode foil containing a valve metal and including a porous part in a surface layer, a molded body or a sintered body of particles containing a valve metal is used as an anode body of a solid electrolytic capacitor element. The molded body or the sintered body has a porous structure as a whole, and thus the whole body corresponds to a porous part. These anode bodies contain many voids in the surface layer or the whole body. An anode part of the anode body on which a solid electrolyte layer is not formed is connected to an electrode terminal. Thus, air may enter an inside of the capacitor element from the electrode terminal side through the voids in the porous part of the anode body.

When the air enters an inside of a solid electrolytic capacitor, a conductive polymer contained in the solid electrolyte layer is oxidized and deteriorated or dopant is decomposed by an action of moisture or oxygen contained in the air, and thus, the solid electrolyte layer may be deteriorated and conductivity may be lowered. The deterioration of the solid electrolyte layer leads to a decrease in performance of the solid electrolytic capacitor, such as a decrease in electrostatic capacity of the solid electrolytic capacitor or an increase in equivalent series resistance (ESR). Such deterioration of the solid electrolyte layer is remarkable particularly in a high-temperature environment.

The solid electrolytic capacitor may be used in the high-temperature environment depending on the application. In addition, the solid electrolytic capacitor is generally soldered to a substrate through a reflow step exposed to a high temperature. Thus, there is a demand for the solid electrolytic capacitor element and the solid electrolytic capacitor that suppress the deterioration in the solid electrolyte layer under the high-temperature environment and have excellent thermal stability.

In view of the above problem, a solid electrolytic capacitor element of the present disclosure includes a porous part in at least a surface layer, and includes a first part as a cathode forming part where a solid electrolyte layer is formed, and a second part where the solid electrolyte layer is not formed. The second part includes at least an anode part including an end of the anode body opposite to the first part. The first part is sectionalized into a plurality of regions, and a groove is present at a boundary between adjacent regions among plurality of regions. The groove serves to block a passage of air. Since a barrier that blocks air is formed at the boundary between the plurality of regions by the groove, entry of air from the anode part side and diffusion of air can be reduced. In addition, since first part is sectionalized into the plurality of regions by the groove, even though air enters from the anode part side, the entry (or diffusion) of air into the region sectionalized by the groove can be reduced. Since the entry of air to the inside of the solid electrolytic capacitor element is reduced, an effect of reducing the deterioration in the solid electrolyte layer is enhanced even after the solid electrolytic capacitor is exposed to the high temperature. Hence, the decrease in capacitor performance (for example, the decrease in electrostatic capacity or the increase in ESR) after the solid electrolytic capacitor is exposed to the high temperature is suppressed, and high thermal stability can be secured. Accordingly, reliability of the solid electrolytic capacitor element can be enhanced. Further, since the deterioration in the solid electrolyte layer is reduced, an increase in dielectric dissipation factor (tan δ) in a case where the solid electrolytic capacitor is exposed to the high temperature can be suppressed to a low level.

When the groove is provided in at least a part of the porous part in at least one of a length direction or a width direction of the anode body, an effect of reducing the entry of air can be obtained in accordance with a ratio of the groove occupying the first part, a width, a length, and a depth of the groove, the number of sectionalized regions, and the like. For example, in an anode foil including a base material part and a porous part of a surface layer positioned on both main surface sides of the base material part, the groove may be provided in at least a part of the porous part in a thickness direction of the anode foil, or may be provided in the base material part in addition to the porous part. For example, the groove may be provided to bite into a part of the base material part from the porous part in the thickness direction of the anode foil. Further, in a case where the anode body is the molded body or the sintered body, since the whole body is the porous part, the groove may be provided in a part of the porous part from the surface toward the inside of the anode body in at least one of the thickness direction or the width direction of the anode body.

Note that the anode body includes an end (may be referred to as a second end) at a side connected to an anode lead terminal (a side on which anode lead is inserted in the case of the molded body or the sintered body), and an end (may be referred to as a first end) at the first part side opposite to the second end (that is, a cathode forming part). The anode part includes an end (that is, the second end) opposite to the first end. A length direction of the anode body is a direction along a straight line connecting a center of an end face (hereinafter, may be referred to as a first end face.) of the first end and a center of an end face (hereinafter, may be referred to as a second end face.) of the second end of the anode body. The foil-shaped or plate-shaped anode body usually includes a pair of main surfaces occupying most of surfaces of the anode body, and a direction perpendicular to the length direction of the anode body on the pair of main surfaces is referred to as the width direction of the anode body. In addition, a direction perpendicular to both the length direction and the width direction of the anode body is referred to as the thickness direction. In the anode foil, the thickness direction of the anode foil is the thickness direction of the anode body. In a case where the anode body has a rectangular parallelepiped shape or a shape similar to the rectangular parallelepiped shape, since a width and a thickness of the anode body are not extremely different from each other, any of the width and the thickness may be used as the width direction (or the thickness direction).

Hereinafter, a solid electrolytic capacitor and a solid electrolytic capacitor element (hereinafter, may be simply referred to as a capacitor element) of the present disclosure, and a method for manufacturing a solid electrolytic capacitor will be described more specifically with reference to the drawings as necessary.

[Solid Electrolytic Capacitor]

A solid electrolytic capacitor includes one or two or more capacitor elements. In at least one capacitor element included in the solid electrolytic capacitor, the anode body may include the first part sectionalized into the plurality of regions by the groove as described above. In 50% or more of the number of capacitor elements included in the solid electrolytic capacitor, the anode body preferably includes the first part sectionalized into the plurality of regions by the groove, more preferably includes the first part sectionalized into the plurality of regions by the groove in 75% or more of the number of capacitor elements, and further preferably includes the first part sectionalized into the plurality of regions by the groove in all the capacitor elements.

In the capacitor element, a ratio of total of a projected area of the groove to an effective area of a cathode part is preferably greater than or equal to 0.002%, and may be greater than or equal to 0.01% or greater than or equal to 0.1%. Here, the projected area is an area projected to the anode body in a depth direction. In a case where the ratio of the total of the projected area of the groove is in such a range, it is advantageous because the entry of air to the inside of the capacitor element can be further reduced. The ratio of the total of the projected area of the groove is, for example, less than or equal to 50%, may be less than or equal to 30%, or may be less than or equal to 20%. In a case where the ratio of the total of the projected area of the groove is in such a range, it is easy to secure a relatively high capacitance. These lower and upper limit values can be arbitrarily combined.

The effective area of the cathode part means an area obtained by calculating total of the projected area after obtaining the projected area for each of the solid electrolyte layers when the solid electrolyte layer at the surface side is orthographic projected with respect to the surface other than the first end face and the second end face of the anode body. In a case where the anode body is the anode foil, the projected area of the cathode part for the end face in the width direction is sufficiently smaller than the projected area of the cathode part for the pair of main surfaces occupying most of the surface of the anode foil. Thus, in the case of the anode foil, as the projected area of the cathode part, total of the projected area when the cathode part at the surface side is orthographic projected onto each of the pair of main surfaces is taken as the effective area of the cathode part. According to the case of the total of the projected area of the cathode part, the total of the projected area of the groove is obtained by calculating a total projected area when all the grooves are orthographic projected onto each surface of the anode body on which the grooves are provided.

The effective area of the cathode part is obtained for the capacitor element in a state where the solid electrolytic capacitor is disassembled, the capacitor element is taken out, the surface layer of the capacitor element is scraped off as necessary, and the solid electrolyte layer is exposed. The effective area is obtained by capturing a digital image of each surface of the anode body of the capacitor element other than the first end face and the second end face from a perpendicular direction, distinguishing the cathode part and the other part by binarization treatment, calculating an area of the part of the cathode part, and adding the areas for the surfaces.

The projected area of the groove can be estimated from an image of a scanning electron microscope (SEM) or an optical microscope of a cross section where the groove of the capacitor element can be observed. A width of an opening of the groove and a length of the groove are measured for each groove from a cross-sectional image, and an area of the opening of the groove obtained from these values corresponds to the projected area of the groove. A total value of the projected area of the groove is obtained by adding the projected areas of all the grooves for each surface. Note that the width of the opening of the groove can be measured from an image of a cross section crossing the groove, and the length of the groove can be measured from an image of a cross section along a length direction of the groove.

When the surface of the first part is viewed perpendicularly to the surface, the groove may be formed in a curved shape, but the groove is preferably linear from the viewpoint of being more easily formed.

The groove can be formed, for example, by performing groove processing on at least a part of the surface layer of the first part. Although the groove may be formed by mechanical groove processing, when the groove is formed by laser processing, a periphery of the groove is melted to form a molten part along the groove. Since an effect of blocking air is further enhanced, it is preferable to form the molten part along the groove. Note that the molten part is a part having a dense structure having a porosity lower than a porosity of the porous part.

The first part may be sectionalized into a plurality of regions by the groove, but the first part is preferably sectionalized into three or more regions, and may be sectionalized into four or more regions, or may be sectionalized into ten or more regions from the viewpoint of further reducing the entry of air from the anode part side. An upper limit of the number of sectionalized regions is not particularly limited, and may be determined within a range in which the ratio of the total of the projected area of the groove in the depth direction to the effective area of the cathode part falls within the above range. The first part may be sectionalized into, for example, 30 or less regions or 20 or less regions. These lower and upper limit values can be arbitrarily combined.

From the viewpoint of further reducing the entry of air from the anode part side, it is preferable to form at least a groove extending along a direction (width direction or the like) intersecting the length direction of the anode body when the surface of the first part is viewed from a direction perpendicular to the surface. The groove extending in such a direction may be referred to as a first groove. A second groove formed to intersect the first groove may be provided in the first part in addition to the first groove. Examples of the second groove include a groove extending along the length direction of the anode body.

In a case where at least one region among the plurality of regions is surrounded by the grooves, since air is further less likely to enter this region, it is advantageous from the viewpoint of securing higher thermal stability. For example, focusing on one surface of the first part, when at least two first grooves extending linearly and at least two second grooves intersecting these first grooves and extending linearly are provided, the region surrounded by the grooves is formed. In this case, the first part is sectionalized in a lattice shape by the groove. In a case where the first part is sectionalized in the lattice shape, the entry of air into the sectionalized region can be further suppressed. In these cases, since the deterioration of the solid electrolyte layer in a case where the solid electrolytic capacitor is exposed to a high temperature can be further reduced, an effect of improving thermal stability can be further enhanced.

A shape of the region sectionalized by the groove when the surface of the first part is viewed from the direction perpendicular to the surface is not particularly limited. When the surface of the first part is viewed from the direction perpendicular to the surface, for example, the first part may include a polygonal region sectionalized by the groove, or may include a quadrangular (at least one shape selected from the group consisting of a rectangle, a square, a parallelogram, a rhombus, a trapezoid, and the like) region sectionalized by the groove.

Assuming that a length (more specifically, the thickness or width of the anode body) of the anode body in the direction along the depth direction of the groove is Tt, the depth of the groove may be, for example, less than or equal to 0.5 Tt, less than or equal to 0.45 Tt, or less than or equal to 0.4 Tt. In a case where the depth of the groove is in such a range, it is easy to secure relatively high strength of the anode body while the entry of air is reduced. The depth of the groove is, for example, greater than or equal to 0.1 Tt, and may be greater than or equal to 0.2 Tt. In a case where the depth of the groove is in such a range, the entry of air can be further reduced. These upper limit values and lower limit values can be arbitrarily combined.

In a case where the anode body is the anode foil, for example, assuming that a thickness of the porous part is Tp, the depth of the groove is preferably greater than or equal to 0.95 Tp, and more preferably greater than or equal to 0.98 Tp, for example. The depth of the groove is, for example, less than or equal to 1.5 Tp, and may be less than or equal to 1.2 Tp. These lower and upper limit values can be arbitrarily combined. In a case where the groove is provided on a part of the surface side of the surface layer, the porous part may be present between the groove and the base material part, but the thickness of the porous part between the groove and the base material part is preferably small from the viewpoint of further reducing the entry of air to the inside of the capacitor element. From the viewpoint of further enhancing the effect of reducing the entry of air, it is preferable that the porous part is not present between the groove and the base material part, and it is also preferable that the groove is formed in a state of biting into the base material part.

The depth of the groove is a maximum depth of the groove obtained in the SEM image of the cross section of the capacitor element crossing the groove.

Thickness (or width) Tt of the anode body is an average value of values measured at a plurality of points (for example, five points) in a region where the groove is not formed in the first part. Thickness Tp of the porous part is an average value of the thicknesses of the porous parts measured at a plurality of points (for example, five points) in the region where the groove of the first part is not formed.

For one groove, the width of the groove may be, for example, in a range from 1 μm to 3 mm, inclusive, in a range from 1 μm to 1.5 mm, inclusive, in a range from 1 μm to 100 μm, inclusive, in a range from 1 μm to 50 μm, inclusive, or in a range from 1 μm to 30 μm, inclusive. In a case where the width of the groove is in such a range, the entry of air from the anode part side can be further reduced, and a certain degree of strength can be easily secured. Note that the width of the groove is the width of the opening of the groove measured in the SEM image of the cross section of the capacitor element crossing the groove. For example, the width of the first groove can be measured by using an image of a cross section parallel to the length direction of the anode body and perpendicular to the width direction. In addition, the width of the second groove can be measured by using an image of a cross section parallel to the width direction of the anode body and perpendicular to the length direction.

The shape of the groove is not particularly limited. The groove may have a slit shape or a hollow. A cross-sectional shape of the groove is not particularly limited, and may be a V-shape, a U-shape, or the like.

In the anode body, an insulating material (hereinafter, may be referred to as a first insulating material) may cover at least a part of a region of the groove. In this case, even though air enters from the anode part side, since air is less likely to pass by the first insulating material, the entry of air to the inside of the capacitor element is further reduced. Further, since the groove is reinforced by the first insulating material, stress applied to the groove can be alleviated. The first insulating material may cover at least a part of the region of the groove, the first insulating material may be disposed on at least a part of an inner surface of the groove, and the groove may be at least partially filled with the first insulating material. Meanwhile, in a case where the porous part is present around the groove, the first insulating material may be contained (for example, impregnated) in the porous part around the groove.

In the anode body, the solid electrolyte layer may be disposed in at least a part of the region of the groove. In this case, even though air enters from the anode part side, since air is less likely to pass by the solid electrolyte layer, the entry of air to the inside of the capacitor element is further reduced. Further, since the groove is reinforced by the solid electrolyte layer, stress applied to the groove can be alleviated. The solid electrolyte layer may cover at least a part of the region of the groove, the solid electrolyte layer may be disposed on at least a part of the inner surface of the groove, and the solid electrolyte layer may be at least partially filled (or may enter) into the groove. For example, when the solid electrolyte layer of the capacitor element is formed, the constituent components of the solid electrolyte layer enter the groove, and thus, the solid electrolyte layer is disposed in the groove.

In the second part of the anode body, the separation part may be provided between the anode part and the cathode forming part that is the first part. In this case, the capacitor element usually includes an insulating material (hereinafter, may be referred to as a second insulating material.) in at least a part of the separation part. The capacitor element includes the second insulating material in the separation part, and thus, it is easy to ensure insulation between the anode part and the cathode part. The second insulating material may be disposed on the surface of the separation part, may be contained in the porous part of the separation part, or may be both of the separation part and the porous part. In a case where the second insulating material is disposed on the surface of the separation part, the second insulating material suppresses the conductive polymer from creeping up to the second part side in a case where the solid electrolyte layer is formed, and regulates contact between the anode part and the cathode part.

Note that the separation part is a region between an end of the second insulating material at the second end side and an end of the first part at the second end side in the anode body.

The separation part may include a recess having a thickness smaller than a thickness of the anode body of the first part (average thickness determined according to the case of thickness Tt). The recess is formed by compressing the porous part or partially removing the porous part. Since the part of the recess has fewer passages for air than the porous part, it is possible to further reduce the entry of air to the inside of the capacitor element from the anode part side by providing the recess. In the recess formed by compression, a compressed porous part (also referred to as a compressed part) is present in a lower region (for example, between the recess and the base material part) of the recess. In a case where the anode body is the anode foil, the porous part may be present between the recess and the base material part in the recess formed by removal, but it is preferable that the porous part is not present such that air is less likely to pass. Note that the recess is a part in which the thickness of the anode body is smaller than the thickness of the anode body of the first part (average thickness determined according to the case of thickness Tt) in the separation part.

The second insulating material may be disposed on the surface of the recess. The second insulating material is disposed in the recess, and thus, the entry of air can be further reduced. Further, the insulation between the anode part and the cathode part can be more easily ensured, and stress applied to the recess can be alleviated by the second insulating material.

The cathode part of the capacitor element has the plurality of layers, and thus, the cathode part has a certain thickness. Accordingly, a stepped part or a recess (hereinafter, may be referred to as a neck) is formed between the part of the second part on the cathode part (or the first part) side and the cathode part. Thus, at least a part of a region from a part of the second part at the cathode part (or the first part) side to a part of the cathode part at the second part side may be covered with an insulating material (hereinafter, may be referred to as a third insulating material.). In a case where the anode body has the separation part, at least a part of the region from the part of the separation part at the cathode part (or first part) side to the part of the cathode part at the second part side may be covered with the third insulating material. Since at least a part of the neck is covered with the third insulating material, the entry of air from the neck to the inside of the capacitor element can be reduced. Further, stress applied to the neck can be alleviated. In addition, for example, at the end of the cathode part at the second part side, there is a part where the solid electrolyte layer is not covered with the cathode lead-out layer. In such a case, the third insulating material may cover at least a part of a surface of the solid electrolyte layer that is not covered with the cathode lead-out layer.

Note that the third insulating material may cover the part other than the neck (for example, the surface (for example, the entire surface of the cathode part) of the cathode part other than the neck) in addition to the neck part. In the neck part and the cathode part, the cathode lead-out layer, the solid electrolyte layer, the first part of the anode body, and the like may be impregnated with the part of the third insulating material.

Hereinafter, a specific exemplary embodiment will be described with reference to the drawings, but a solid electrolytic capacitor element and a solid electrolytic capacitor of the present disclosure are not limited to the exemplary embodiment.

Figure 2:
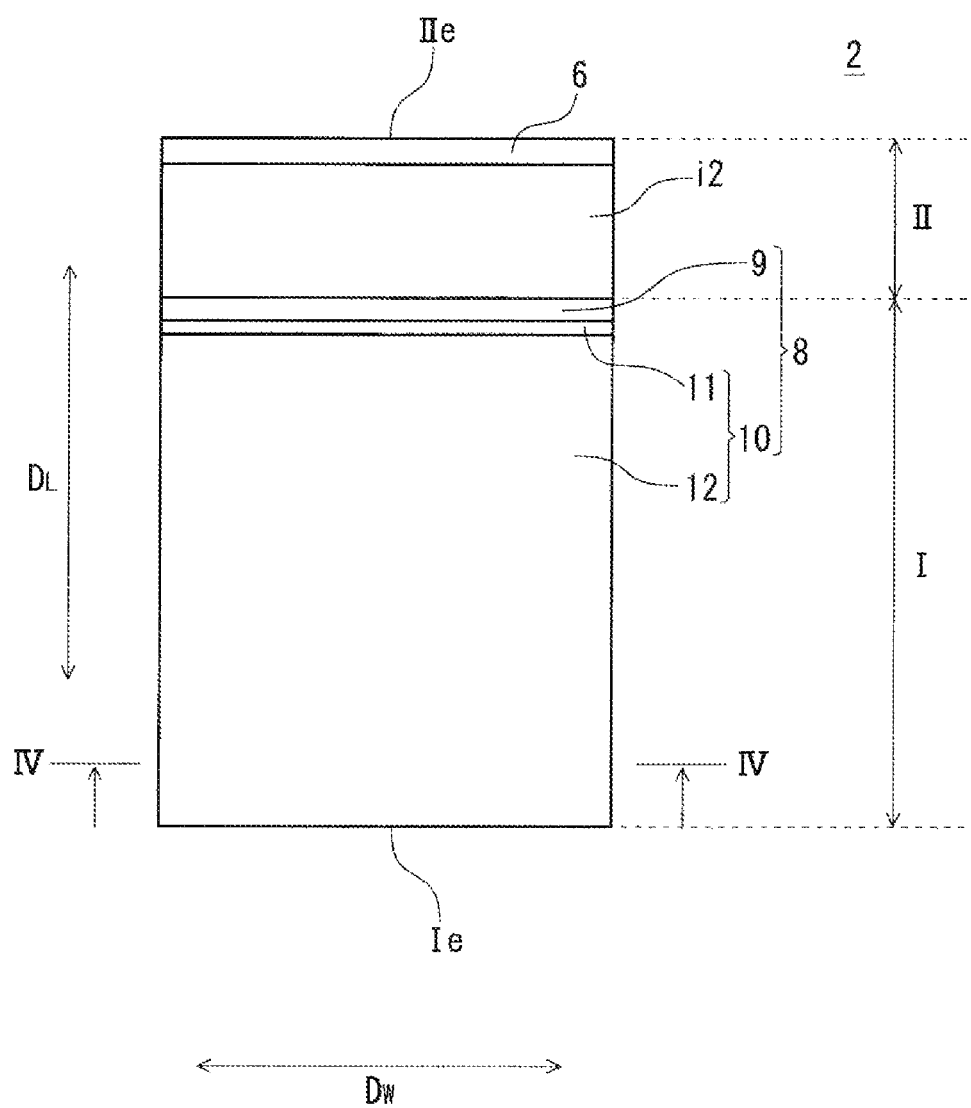
FIG. 2 is a plan view schematically illustrating a solid electrolytic capacitor element included in the solid electrolytic capacitor of FIG. 1.
Figure 3:
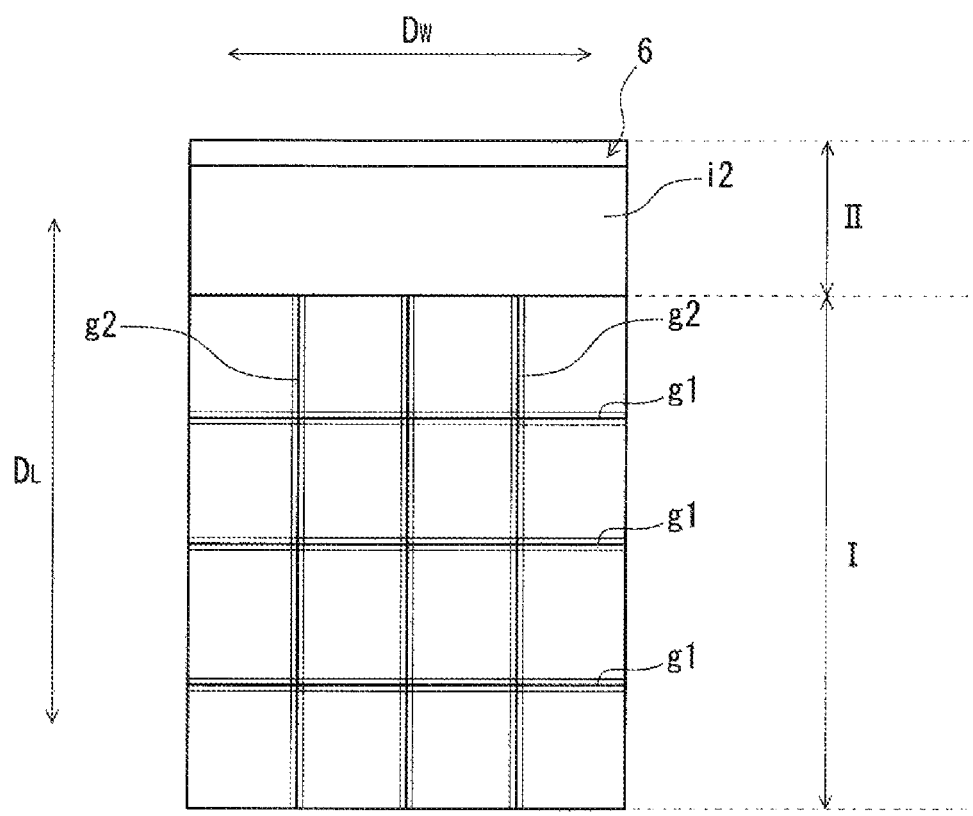
FIG. 3 is a plan view schematically illustrating an anode foil included in the solid electrolytic capacitor element of FIG. 2.
Figure 4:
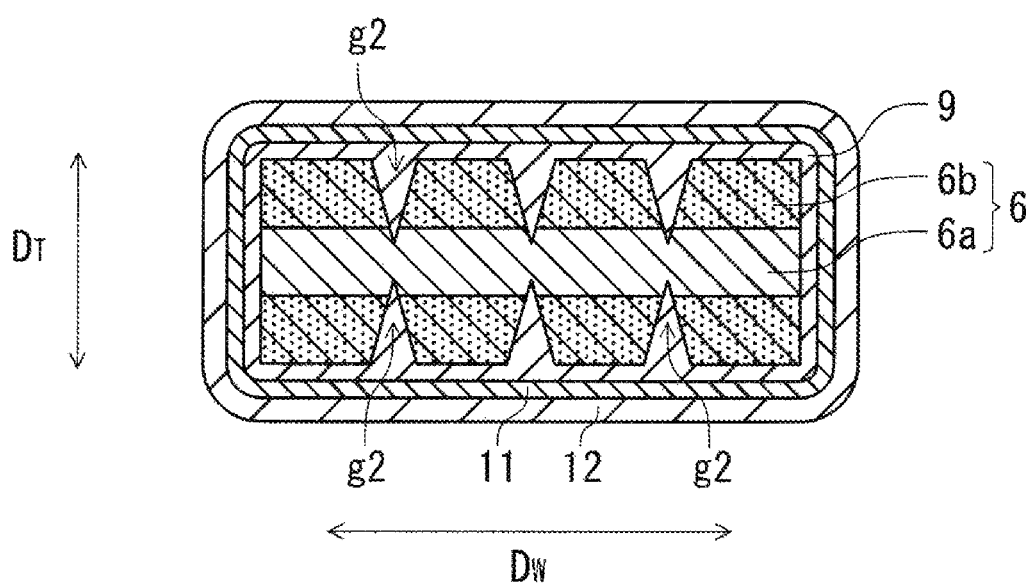
FIG. 4 is a schematic cross-sectional view when a cross section taken along line IV-IV in FIG. 2 is viewed in an arrow direction.

FIG. 1 is a cross-sectional view schematically illustrating a structure of a solid electrolytic capacitor according to a first exemplary embodiment of the present disclosure. FIG. 2 is a plan view schematically illustrating a state of a capacitor element included in the solid electrolytic capacitor in FIG. 1 as viewed from one surface side of a pair of main surfaces that occupy most of a surface area of an anode foil. FIG. 3 is a plan view schematically illustrating a state where the anode foil included in the capacitor element in FIG. 2 is viewed from one main surface side of the anode foil. FIG. 4 is a schematic cross-sectional view of the capacitor element taken along line IV-IV in FIG. 2 as viewed in a direction of an arrow.

Solid electrolytic capacitor 1 includes capacitor element 2, exterior body 3 that seals capacitor element 2, and anode lead terminal 4 and cathode lead terminal 5 that are each at least partially exposed to the outside of exterior body 3. Exterior body 3 has a substantially rectangular parallelepiped outer shape, and solid electrolytic capacitor 1 also has a substantially rectangular parallelepiped outer shape.

Capacitor element 2 includes anode foil 6, a dielectric layer (not shown) covering a surface of anode foil 6, and cathode part 8 covering the dielectric layer. The dielectric layer may be formed on at least a part of the surface of anode foil 6.

Cathode part 8 includes solid electrolyte layer 9 and cathode lead-out layer 10. Solid electrolyte layer 9 is formed so as to cover at least a part of the dielectric layer. Cathode lead-out layer 10 is formed so as to cover at least a part of solid electrolyte layer 9. Cathode lead-out layer 10 incudes first layer 11 that is a carbon layer and second layer 12 that is a metal paste layer. Cathode lead terminal 5 is electrically connected to cathode part 8 with adhesive layer 14 made of a conductive adhesive interposed therebetween.

Anode foil 6 includes base material part 6a and porous part 6b formed on a surface of base material part 6a. Anode foil 6 includes first part I that is a cathode forming part where solid electrolyte layer 9 (or cathode part 8) is formed, and second part II other than first part I. Second part II includes at least anode part iia. Anode lead terminal 4 is electrically connected to anode part iia of anode foil 6 by welding. Anode foil 6 includes second end IIe at a side connected to anode lead terminal 4 and first end Ie opposite to second end IIe.

In the illustrated example, second part II includes separation part iib in addition to anode part iia. Separation part iib is positioned between anode part iia and first part I. Although second insulating material i2 is disposed on a surface of separation part iib, the present disclosure is not limited to this case, and separation part iib may include second insulating material i2 at least partially. For example, second insulating material i2 such as an insulating tape may be disposed on the surface of separation part iib, and a coating film of second insulating material i2 may be formed on the surface of separation part iib. Further, second insulating material i2 may be contained (for example, impregnated) in the porous part of separation part iib. Capacitor element 2 may include both second insulating material i2 disposed on the surface of separation part iib and second insulating material i2 included in separation part iib. Separation part iib including second insulating material iib is provided between anode part iia and first part I as the cathode forming part in this manner, and thus, insulation between anode part iia and cathode part 8 can be more easily ensured.

As shown in FIG. 3, a plurality of first grooves g1 linearly extending along width direction DW of anode foil 6 and a plurality of second grooves g2 intersecting first grooves g1 and linearly extending along length direction DL are provided in first part I of anode foil 6 when the main surface of anode foil 6 is viewed from a direction perpendicular to the surface. In the illustrated example, first part I is sectionalized into a plurality of regions in a lattice shape by providing the plurality of first grooves g1 and the plurality of second grooves g2 intersecting each other. First groove g1 or second groove g2 is present at a boundary between adjacent regions among the plurality of regions. In the illustrated example, first part I is sectionalized into 16 regions on one main surface. As described above, first part I is sectionalized into a plurality of regions by first groove g1 and second groove g2, and thus, entry of air to the inside of capacitor element 2 from anode part iia side can be reduced. Hence, even in a case where solid electrolytic capacitor 1 is exposed to a high temperature, a decrease in capacitor performance is suppressed, and high thermal stability can be secured. Further, each of four regions positioned at the center of 16 regions is in a state where the periphery is surrounded by first groove g1 and second groove g2. In the region surrounded by the grooves, the entry of air is further reduced.

As shown in FIGS. 1 and 4, each of first groove g1 and second groove g2 is formed to partially bite into base material part 6a in addition to porous part 6b of the surface layer. Each of first groove g1 and second groove g2 is formed from the surface of anode foil 6 to base material part 6a, and thus, the entry of air from anode part iia can be further reduced. However, the present disclosure is not limited to this case, and each of first groove g1 and second groove g2 may be provided only in the surface layer. For example, each of first groove g1 and second groove g2 may be formed in a part of porous part 6b in thickness direction DT, or may be formed in the entire thickness of porous part 6b.

In capacitor element 2 in the illustrated example, as shown in FIGS. 1 and 4, each of first groove g1 and second groove g2 is filled with solid electrolyte layer 9. Solid electrolyte layer 9 may not be filled in each of first groove g1 and second groove g2, and may be disposed in at least a partial region in each of first groove g1 and second groove g2. Solid electrolyte layer 9 is disposed in at least a part of the region in each of first groove g1 and second groove g2, and thus, it is possible to further reduce the entry of air from anode part iia side to the inside of capacitor element 2 and to alleviate stress applied to first groove g1 and second groove g2.

Since cathode part 8 of capacitor element 2 has a certain thickness, a stepped part (neck) is formed near a boundary between cathode part 8 (or first part I) and second part II. Thus, at least a part of a region extending from a part of second part II at cathode part 8 side to a part of cathode part 8 at second part II side may be covered with third insulating material i3. Accordingly, since at least a part of the stepped part (neck) is covered with third insulating material i3, it is possible to reduce the entry of air from this part and to alleviate stress applied to the stepped part (neck).

Exterior body 3 covers a part of capacitor element 2 and lead terminals 4 and 5. From the viewpoint of suppressing the entry of air to the inside of exterior body 3, it is desirable that a part of capacitor element 2 and lead terminals 4 and 5 is sealed with exterior body 3. Although FIG. 1 shows the case where exterior body 3 is a resin exterior body, the present disclosure is not limited to this case, and exterior body 3 may be a case or the like capable of housing capacitor element 2. The resin exterior body is formed by sealing a part of capacitor element 2 and lead terminals 4 and 5 with a resin material.

One ends of lead terminals 4 and 5 are electrically connected to capacitor element 2, and the other ends are led out of exterior body 3. In solid electrolytic capacitor 1, one end sides of lead terminals 4 and 5 are covered with exterior body 3 together with capacitor element 2.

Although the illustrated example shows the case where first groove g1 and second groove g2 are filled with solid electrolyte layer 9, the present disclosure is not limited to the case. For example, at least a part of the surface of each of first groove g1 and second groove g2 may be covered with the first insulating material. Each groove may be at least partially filled with the first insulating material. In this case, the entry of air to the inside of capacitor element 2 from anode part iia side can be further reduced, and the stress applied to first groove g1 and second groove g2 can be alleviated.

Meanwhile, although not illustrated, both the first insulating material and solid electrolyte layer 9 may be disposed in each of first groove g1 and second groove g2. For example, each groove in a state where at least a part of an inner surface is covered with the first insulating material may be at least partially filled with solid electrolyte layer 9.

Hereinafter, a configuration of the solid electrolytic capacitor will be described in more detail. The descriptions are contents common to the solid electrolytic capacitor of the present disclosure including the above specific exemplary embodiment, and do not limit only the above specific exemplary embodiment.

(Capacitor Element)

The capacitor element includes the anode body, the dielectric layer, and the cathode part. The cathode part includes at least the solid electrolyte layer, and may include the cathode lead-out layer covering the solid electrolyte layer in addition to the solid electrolyte layer. The capacitor element may include at least one selected from the group consisting of the above first insulating material, second insulating material, and third insulating material.

(Anode Body)

The anode body may include a valve metal, an alloy containing the valve metal, a compound containing the valve metal, or the like. These materials can be used singly or in combination of two or more kinds thereof. As the valve metal, for example, aluminum, tantalum, niobium, and titanium are preferably used. The anode body including a porous part in a surface layer can be obtained, for example, by roughening a surface of a base material (a foil-shaped or plate-shaped base material or the like) containing the valve metal by etching or the like. The roughening can be performed by, for example, an etching treatment or the like. Further, the anode body may be a molded body of particles that contain the valve metal or a sintered body of the molded body. Note that each of the molded body and the sintered body has a porous structure.

(Dielectric Layer)

The dielectric layer is an insulating layer that functions as a dielectric material. The dielectric layer is formed by anodizing the valve metal of the surface of the anode body. The dielectric layer may be formed to cover at least a part of the anode body. The dielectric layer is usually formed on the surface of the anode body. Since the dielectric layer is formed on the surface of the porous part of the anode body, the dielectric layer is formed along inner wall surfaces of holes and hollows (also referred to as pits) in the surface of the anode body.

The dielectric layer contains an oxide of a valve metal. For example, in a case where tantalum is used as the valve metal, the dielectric layer contains $Ta_2O_5$, and in a case where aluminum is used as the valve metal, the dielectric layer contains $Al_2O_3$. Note that the dielectric layer is not limited thereto, and any dielectric layer may be used as long as the dielectric layer functions as a dielectric material.

(Insulating Material)
(First Insulating Material)

An insulating resin (may be referred to as a first insulating resin.) or the like is used as the first insulating material. From the viewpoint of easily securing high penetration of the first insulating material into the groove, the first insulating material is preferably a cured product (including a half-cured product) of a curable resin or a composition thereof. The curable resin may be thermosetting or photocurable. Examples of the photocurable resin or the composition thereof include resins cured by ultraviolet rays, or visible light. From the viewpoint of easily penetrating the first insulating material into the groove, it is preferable to use a photocurable (in particular, ultraviolet curability) resin or a composition thereof. The curable resin composition may contain, for example, at least one selected from the group consisting of a curing agent, a curing accelerator, a catalyst, and an additive agent in addition to the curable resin.

Examples of the curable resin (may be referred to as a first curable resin.) used as the first insulating material include an epoxy resin, a phenol resin, an unsaturated polyester resin, a thermosetting polyurethane resin, and a thermosetting polyimide, and are not limited thereto. The first curable resin may be used alone, or may be used in combination of two or more kinds thereof. The first curable resin may be a one-component curable resin or a two-component curable resin.

(Second insulating Material)

An insulating resin (may be referred to as a second insulating resin.) or the like is used as the second insulating material. The second insulating material may contain one kind or two or more kinds of second insulating resins.

Examples of the second insulating material disposed on the surface of the separation part include an insulating tape (resist tape or the like) containing a second insulating resin, and a coating film containing a second insulating resin, but are not limited thereto. The second insulating resin contained in such a second insulating material may be a thermoplastic resin (or a thermoplastic resin composition), or may be a curable resin (may be referred to as a second curable resin.) or a cured product (including a half-cured product) of the composition thereof. Examples of the thermoplastic resin as the second insulating resin include polyolefins, polyesters, polyamides, and thermoplastic polyimides. The second curable resin may be thermosetting or photocurable. Examples of the photocurable resin or the composition thereof include resins cured by ultraviolet rays, or visible light. Examples of the second curable resin or the composition thereof include an epoxy resin, polyimide, and photoresist. The composition of the second curable resin may contain, for example, at least one selected from the group consisting of a curing agent, a curing accelerator, a catalyst, and an additive agent in addition to the second curable resin.

In a case where the porous part of the separation part contains the second insulating material, examples of such a second insulating material include materials described for the first insulating material. From the viewpoint of easily impregnating the voids of the porous part with the curable resin or the composition, it is preferable to use the curable resin (also referred to as the second curable resin.) or the composition thereof, particularly the photocurable (in particular, ultraviolet curability) resin or the composition thereof. As such a second curable resin, the description of the first curable resin can be referred to. The second insulating material may be the same as or different from the first insulating material.

(Third Insulating Material)

An insulating resin (also referred to as a third insulating resin.) or the like is used as the third insulating material. The third insulating material may be a thermoplastic resin, or may be a curable resin (also referred to as a third curable resin.) or a cured product (including a half-cured product) of a composition thereof. The third insulating material may contain one kind or two or more kinds of third insulating resins.

Examples of the thermoplastic resin as the third insulating resin include at least one selected from the group consisting of vinyl resin (for example, vinyl chloride, vinyl acetate, and aromatic vinyl resin), polyolefin (for example, polyethylene and polypropylene), acrylic resin, polyamide, polycarbonate, thermoplastic polyimide, and polyamide-imide. Examples of the aromatic vinyl resin include polystyrene and an acrylonitrile-butadiene-styrene copolymer (ABS resin).

As the third curable resin, the description of the first curable resin can be referred to.

The third insulating material may be the same as or different from the first insulating material. The third insulating material may be the same as or different from the second insulating material.

(Cathode Part)

The cathode part includes a solid electrolyte layer and a cathode lead-out layer. The solid electrolyte layer covers at least a part of the dielectric layer. The cathode lead-out layer covers at least a part of the solid electrolyte layer. The cathode part is formed on at least a part of the surface of the first part of the anode foil with a dielectric layer interposed therebetween. Hereinafter, the solid electrolyte layer and the cathode lead-out layer will be described.

(Solid Electrolyte Layer)

The solid electrolyte layer is formed on the surface of the first part of the anode body. The solid electrolyte layer may be disposed in at least a part of the region of the groove of the anode body.

The solid electrolyte layer contains a conductive polymer. The solid electrolyte layer may further contain at least one selected from the group consisting of a dopant and other additive agents as necessary. Examples of the dopant include p-toluenesulfonic acid, naphthalenesulfonic acid, and polystyrenesulfonic acid (PSS), and are not limited thereto.

For example, a π-conjugated polymer can be used as the conductive polymer. Examples of the conductive polymer include polymers having polypyrrole, polythiophene, polyaniline, polyfuran, polyacetylene, polyphenylene, polyphenylene vinylene, polyacene, and polythiophene vinylene as a basic skeleton. The polymer also includes a homopolymer, a copolymer of two or more kinds of monomers, and derivatives of these polymers (a substitute having a substituent group). For example, polythiophene includes poly (3,4-ethylenedioxythiophene) and the like. However, these components are merely specific examples, and the conductive polymer is not limited to these specific examples.

The solid electrolyte layer may be formed to cover at least a part of the dielectric layer. The solid electrolyte layer may be formed directly on the dielectric layer or may be formed with a conductive precoat layer interposed therebetween. The precoat layer is formed of a conductive material (conductive polymer, inorganic conductive material, and the like), for example. The conductive material forming the precoat layer is not particularly limited, and a known material can be used, for example.

(Cathode Lead-Out Layer)

The cathode lead-out layer only needs to include at least a first layer that is in contact with the solid electrolyte layer and covers at least a part of the solid electrolyte layer, and may include a first layer and a second layer covering the first layer. Examples of the first layer include a layer containing conductive particles and a metal foil. Examples of the conductive particles include at least one selected from conductive carbon and metal powder. For example, the cathode lead-out layer may include a layer (also referred to as a carbon layer) containing conductive carbon as the first layer, and a layer containing metal powder or a metal foil as the second layer. In a case where a metal foil is used as the first layer, this metal foil may constitute the cathode lead-out layer.

Examples of the conductive carbon include graphite (artificial graphite, natural graphite, and the like).

The layer containing metal powder as the second layer can be formed, for example, by stacking a composition containing metal powder on a surface of the first layer.

Examples of such a second layer include a metal paste layer formed using a composition containing metal powder such as silver particles and a resin (binder resin). As the resin, although a thermoplastic resin can be used, a thermosetting resin such as an imide resin or an epoxy resin is preferably used.

In a case where a metal foil is used as the first layer, the type of metal is not particularly limited, but it is preferable to use a valve metal such as aluminum, tantalum, or niobium, or an alloy containing the valve metal. A surface of the metal foil may be roughened as necessary. On the surface of the metal foil may be provided an anodization film, a coating film of a metal (different type of metal) different from the metal that constitutes the metal foil, or a nonmetal film. Examples of the different type of metal and nonmetal include metals such as titanium and nonmetals such as carbon (conductive carbon or the like).

A coating film of the different type of metal or nonmetal (for example, conductive carbon) may be used as the first layer, and the metal foil may be used as the second layer.

(Separation Part)

In a case where the metal foil is used for the cathode lead-out layer, a separation part may be disposed between the metal foil and the anode foil. The separation part is not particularly limited. For example, it is possible to use an unwoven fabric including fibers of cellulose, polyethylene terephthalate, vinylon, or polyamide (for example, aliphatic polyamide or aromatic polyamide such as aramid).

(Others)

The solid electrolytic capacitor may be a wound type, or may be either a chip type or a stacked type. For example, the solid electrolytic capacitor may include a stack body of two or more capacitor elements. The configuration of the capacitor element may be selected in accordance with the type of the solid electrolytic capacitor.

In the capacitor element, one end of the cathode lead terminal is electrically connected to the cathode lead-out layer. The cathode lead terminal is joined to the cathode layer with, for example, a conductive adhesive applied onto the cathode layer interposed therebetween. One end of the anode lead terminal is electrically connected to the anode foil. As the lead terminals, a lead terminal used in a solid electrolytic capacitor can be used without particular limitation, and a so-called lead frame may be used, for example. Examples of the material of each lead terminal include a metal (copper or the like) or an alloy thereof.

The solid electrolytic capacitor includes, for example, a capacitor element and a resin exterior body or a case for sealing the capacitor element. Examples of the case include a combination of a container such as a bottomed case and a sealing body that seals an opening of the container. Examples of the material forming each of the container and the sealing body include a metallic material and a resin material.

The resin exterior body preferably contains a cured product of a curable resin composition, and may contain a thermoplastic resin or a composition containing the thermoplastic resin. The curable resin composition contains, for example, a curable resin and a filler. The curable resin is preferably a thermosetting resin. Examples of the resin material forming the case include a thermoplastic resin or a composition containing the thermoplastic resin. Examples of the metallic material forming the case include metals such as aluminum, copper, and iron, or alloys thereof (also including stainless steel, brass, and the like).

In the capacitor element, the other end of the anode lead terminal and the other end of the cathode lead terminal are sealed in a state of being led out from the resin exterior body or the case, respectively. The other end of each terminal exposed from the resin exterior body or the case is used for, for example, solder connection to a substrate (not shown) on which the solid electrolytic capacitor is to be mounted.

[Method for Manufacturing Solid Electrolytic Capacitor]

Hereinafter, a method for manufacturing the solid electrolytic capacitor will be described. The descriptions are contents common to the solid electrolytic capacitor of the present disclosure including the above specific exemplary embodiment, and do not limit only the above specific exemplary embodiment.

The solid electrolytic capacitor can be manufactured, for example, by a manufacturing method including a step of preparing a capacitor element (first step), a step of electrically connecting a lead terminal to the capacitor element (second step), and a step of covering a part of the capacitor element and the lead terminal with an exterior body (third step).

Hereinafter, each step will be described in more detail.

(First Step)

In the first step, the capacitor element is produced. The first step can include (i) a step of preparing an anode body, (ii) a step of forming a dielectric layer, (iii) a step of forming a groove in the anode body, (iv) a step of forming a solid electrolyte layer, and (v) a step of forming a cathode lead-out layer as necessary. The first step may further include a step (vi) of applying a first insulating material to at least a part of a region of the groove after step (iii) and before step (iv). In addition, the first step may further include a step (vii) of providing a separation part by applying a second insulating material to a region between an anode part and a first part after step (iii) and before step (iv). The first step may further include a step (viii) of applying a third insulating material to a neck after step (v).

((i) Step of Preparing Anode Body)

In this step, an anode body including a porous part in at least a surface layer and including a first part as a cathode forming part and a second part including at least an anode part is prepared.

In a case where the anode body has a foil shape or a plate shape, the porous part can be formed, for example, by roughening a surface of a metal foil or a metal plate containing a valve metal, and is provided in a surface layer of the anode body. In this case, a base material part that is not roughened is formed inside the metal foil or the metal plate, and the porous part is formed on a surface of the base material part. The roughening may be performed as long as irregularities can be formed on the surface layer of the metal foil or the metal plate, and may be performed by etching (for example, electrolytic etching) the surface of the metal foil, for example. Alternatively, a molded body or a sintered body of particles containing a valve metal may be prepared as the anode body.

In a case where a separation part is provided in the anode body, in this step, a recess may be formed in a region between the anode part and the first part of the anode body, which corresponds to the separation part. For example, a second insulating material is disposed on a surface of the formed recess in step (vi) to be described later. Such a recess can be formed, for example, by compressing or removing at least a part of the porous part in the region between the anode part and the first part of the anode body. Compression and removal may be combined as necessary. The compression can be performed by press working or the like. The removal of the porous part can be performed by mechanical groove processing, laser processing, or the like.

Note that the recess is not necessarily formed in this step, and may be formed after this step and before the second insulating material is disposed on the surface.

((ii) Step of Forming Dielectric Layer)

In this step, a dielectric layer is formed on the anode body. The dielectric layer is formed by anodizing the anode body. The anodizing may be performed by a known method such as an anodizing treatment. The anodizing treatment can be performed, for example, by immersing the anode body in an anodizing solution and applying a voltage between the anode body as an anode and a cathode immersed in the anodizing solution. As the anodizing liquid, for example, a phosphoric acid aqueous solution or the like is preferably used.

Note that step (ii) may be performed at one stage or at multiple stages. For example, in a case where step (iii) is performed after step (ii), it is preferable to perform step (ii) again after step (iii). Similarly, in a case where the above recess is formed after step (ii), step (ii) may be performed again after the recess is formed as necessary. Note that step (ii) is performed before steps (iv) to (viii).

((iii) Step of Forming Groove)

The groove can be formed by performing groove processing on the surface of the first part of the anode body. Examples of the groove processing include mechanical grooving using a blade or the like and laser processing. When the laser processing is used, the groove can be easily formed. In this case, in the first part, the groove can be formed by irradiating a part of the porous part with a laser beam.

For example, a pulse laser is preferably used for the laser processing. Due to the use of the pulse laser, the groove can be formed, and the molten part is easily formed along the groove. Thus, the entry of air can be further reduced.

Pulse energy is, for example, in a range from 1 µJ to 20 µJ, inclusive, may be in a range from 3 µJ to 15 µJ, inclusive, or may be in a range from 5 µJ to 10 µJ, inclusive. In a case where the pulse energy is in such a range, the groove can be formed, and the molten part is easily formed along the groove. Thus, the entry of air can be further reduced.

Step (iii) may be performed before step (iv) and steps (vi) to (viii), may be performed after step (ii), or may be performed as a substep in step (i).

((vi) Step of Applying First Insulating Material)

In this step, the first insulating material is applied to at least a part of the region of the groove. Step (vi) is performed after steps (ii) and (iii) and before step (iv).

The first insulating material may be applied to cover at least a part of the groove. For example, the groove may be impregnated or filled with the first insulating material. When the first insulating material is applied to the groove, the first insulating material may also be applied to a part around the groove. For example, the first insulating material may be attached to a surface of the part around the groove, or may be impregnated into the porous part around the groove.

The application of the first insulating material is performed by using a known method, for example, at least one selected from the group consisting of a coating method or a dispensing method using various coaters or dispensers, immersion, and transfer (roller transfer or the like).

The first insulating material is applied to the groove in a flowable state. In a case where the first insulating material covering at least a part of the region of the groove is a cured product of a curable resin or a composition thereof, the curable resin or the composition thereof may be applied. In addition, a treatment liquid (specifically, a solution or a dispersion (coating agent or the like)) containing the first insulating material and a liquid medium may be applied to the groove to dry the liquid medium. From the viewpoint of easily filling the groove with the first insulating material in a large amount, it is preferable to supply a solvent-free curable resin or a composition as the first insulating material to the groove.

The curable resin or the composition thereof applied to the groove may be cured in at least one of this step and the subsequent step as necessary.

((vii) Step of Providing Separation Part by Applying Second Insulating Material)

In step (vii), the second insulating material is applied to the region between the anode part and the first part, and the separation part including the second insulating material is provided at least partially. Step (vii) is performed after step (ii) and before step (iv). Step (vii) is performed before step (iv), and thus, it is possible to suppress the conductive polymer from creeping up to the anode part side when the solid electrolyte layer is formed.

The second insulating material is provided in the region between the anode part and the first part, for example, by disposing the second insulating material on the surface of the anode body or impregnating the porous part with the second insulating material. In a case where the recess is formed between the anode part and the first part by compression or removal of the porous part, the second insulating material may be disposed on the surface of the recess.

More specifically, for example, in the region between the anode part and the first part, the second insulating material may be disposed by bonding an insulating tape (resist tape or the like) to the surface of the anode body. Meanwhile, in a case where the second insulating material is a cured product of a curable resin or a composition thereof, the second insulating material may be disposed by applying the curable resin or the composition thereof onto the surface of the anode body. Further, the second insulating material may be disposed by applying a treatment liquid (specifically, a solution or a dispersion (coating agent or the like)) containing the second insulating material and a liquid medium onto the surface of the anode body and drying the treatment liquid.

Meanwhile, the porous part may contain the second insulating material by impregnating the porous part with the second insulating material (for example, a treatment liquid (coating agent or the like) containing a curable resin or a composition thereof and a second insulating material) in a flowable state in at least a part of the region between the anode body and the first part.

The second insulating material may be disposed on the surface of the anode body, and the porous part may be impregnated with the second insulating material in a flowable state. The second insulating material disposed on the surface of the anode body and the second insulating material with which the porous part is impregnated may be the same or different. Either the disposition of the second insulating material or the impregnation of the second insulating material may be performed first.

In a case where the curable resin or the composition thereof is used as the second insulating material, the second insulating material may be cured in at least one of this step and the subsequent step as necessary.

((iv) Step of Forming Solid Electrolyte Layer)

In this step, the solid electrolyte layer is formed to cover at least a part of the dielectric layer.

The solid electrolyte layer is formed, for example, by polymerizing a precursor on the dielectric layer using a treatment liquid containing the precursor of the conductive polymer. The polymerization can be performed by at least one of chemical polymerization and electrolytic polymerization. In the case of electrolytic polymerization, a conductive precoat layer may be formed prior to electrolytic polymerization. Examples of the precursor of the conductive polymer include at least one selected from the group consisting of a monomer, an oligomer, and a prepolymer.

The solid electrolyte layer may be formed by attaching a treatment liquid (for example, a dispersion or a solution) containing a conductive polymer to the dielectric layer, and then drying the treatment liquid. Examples of the dispersion medium (or solvent) include water, an organic solvent, and a mixture thereof.

The treatment liquid may further contain other components (at least one selected from the group consisting of a dopant and an additive agent or the like).

For example, the solid electrolyte layer can be disposed in at least a part of the region of the groove by performing polymerization in a state where the groove is brought into contact with the treatment liquid containing the precursor of the conductive polymer or by bringing the treatment liquid containing the conductive polymer into contact with the groove.

((v) Step of Forming Cathode Lead-Out Layer)

In this step, the cathode lead-out layer is formed by forming at least the first layer on the solid electrolyte layer. The cathode lead-out layer may be formed by sequentially stacking the first layer and the second layer. The cathode lead-out layer is formed to cover at least a part of the solid electrolyte layer. By doing this, the cathode part including the solid electrolyte layer and the cathode lead-out layer is formed.

The first layer (carbon layer) containing conductive carbon can be formed by, for example, immersing an anode body having a dielectric layer on which a solid electrolyte layer is formed in a dispersion containing conductive carbon, or applying a paste containing conductive carbon onto a surface of the solid electrolyte layer.

The layer containing metal powder (specifically, the metal paste layer) as the second layer can be formed, for example, by stacking a paste-shaped composition containing metal powder on the surface of the first layer. For example, a composition containing a metal powder such as silver particles and a resin (binder resin) is used as the composition.

In a case where the metal foil is used as the first layer, the metal foil is stacked on the solid electrolyte layer with the separation part interposed between the anode body and the metal foil as necessary. If necessary, the surface of the metal foil may be roughened by etching treatment or the like. At least one of a coating film containing at least one selected from the group consisting of different type of metal and nonmetal (conductive carbon or the like) and an anodization film may be formed on the surface of the metal foil.

A coating film containing at least one selected from the group consisting of different type of metal and nonmetal (conductive carbon or the like) may be formed as the first layer on the surface of the solid electrolyte layer, and a metal foil may be stacked as the second layer on the surface of the first layer.

((viii) Step of Applying Third Insulating Material)

In this step, a third insulating material is applied to at least a part of a region extending from a part of the second part at the cathode part side to a part of the cathode part at the second part side. In such a region, as described above, since a stepped part or a recess (neck) is formed by a thickness of the cathode part, at least a part of the neck is covered with the third insulating material in step (viii). Accordingly, it is easy to secure insulation between the anode part and the cathode part, and is also possible to reduce the entry of air from the neck to the inside of the capacitor element. Further, stress applied to the neck can be alleviated.

The third insulating material is applied to at least a part of the region from the part of the second part at the cathode part side to the part of the cathode part at the second part side in a flowable state. In a case where the third insulating material covering at least a part of this region is a cured product of a curable resin or a composition thereof, the third insulating material is applied to the curable resin or the composition thereof in a flowable state. Further, a treatment liquid (specifically, a solution or a dispersion (coating agent or the like)) containing the second insulating material and the liquid medium may be applied to at least a part of the region to dry the liquid medium.

The third insulating material can be applied by using, for example, the method described for applying the first insulating material. If necessary, the entire neck and cathode part of the capacitor element obtained in step (v) may be immersed in third insulating material in a flowable state to cover the surface of the cathode part with the third insulating material. A part of the third insulating material may be impregnated into the cathode lead-out layer, the part of the solid electrolyte layer, the first part of the anode body, and the like in the neck and the cathode part.

In the first step, step (viii) may be performed after step (v). Step (viii) is performed before the third step. Step (viii) may be performed before or after the anode lead terminal is connected to the anode part in the second step.

In a case where the curable resin or the composition thereof is used as the third insulating material, the third insulating material may be cured in at least one of this step and the subsequent step as necessary.

(Others)

Note that in a case where multiple capacitor elements are stacked, a stacked body of the capacitor elements may be prepared in the first step (in other words, before the second step) by producing each capacitor element and then stacking the capacitor elements.

(Second Step)

In the second step, the anode lead terminal and the cathode lead terminal are electrically connected to the capacitor element. The lead terminals may be connected after the capacitor element is produced in the first step. The connecting of the cathode lead terminal to the capacitor element is performed after the capacitor element is produced, but the connecting of the anode lead terminal to the anode body may be performed at an appropriate stage of the step of producing the capacitor element.

In a case where a stacked body of a plurality of capacitor elements is used, the anode lead terminal may be connected to the anode body in the same manner as described above. The cathode lead terminal may be connected to the capacitor element in the same manner as described above, or one end of the cathode lead terminal may be connected to the stacked body of the plurality of capacitor elements in which the cathode parts are electrically connected to each other.

(Third Step)

In the third step, the capacitor element is sealed with the exterior body by covering the capacitor element and parts of the lead terminals with the exterior body. The sealing can be performed according to the type of the exterior body.

In the case of the resin outer packing, the capacitor element and a part of the anode lead terminal and the cathode lead terminal connected to the capacitor element can be covered with a raw material resin (for example, a curable resin composition, a thermoplastic resin, or a composition thereof) of the resin exterior body, and can be sealed by being molded into a predetermined shape. The resin exterior body can be formed by using a molding technique such as injection molding, insert molding, compression molding, or transfer molding. At this time, a part on the other end side of each lead terminal led out from the capacitor element is sealed in an exposed state.

In a case where a case-shaped exterior body including a container such as a bottomed case and a sealing body is used, a capacitor element is housed in the container, and an opening of the container can be covered and sealed with a sealing body, for example, in a state where the other end of a lead terminal connected to the capacitor element is led out from a through hole formed in the sealing body.

The solid electrolytic capacitor according to the present disclosure has high thermal stability, and a decrease in capacitor performance (for example, an increase in ESR and a decrease in electrostatic capacity are caused) in a case where the solid electrolytic capacitor is exposed to a high temperature is reduced. Hence, the electrolytic capacitor can be used in various applications such as applications requiring low ESR and high electrostatic capacitance of the solid electrolytic capacitor, and applications exposed to heat. These applications are merely examples, and the present disclosure is not limited thereto.

The invention claimed is:

1. A solid electrolytic capacitor element comprising:
an anode body that includes a base material part, and a porous part disposed on a main surface of the base material part;
a dielectric layer that is disposed on at least a part of a surface of the anode body; and
a cathode part that covers at least a part of the dielectric layer, wherein:
the cathode part includes a solid electrolyte layer that covers the at least a part of the dielectric layer,
the anode body includes a first part and a second part, the first part being a cathode forming part on which the solid electrolyte layer is formed, the second part being a part on which the solid electrolyte layer is not formed,
the second part includes at least an anode part including an end of the anode body opposite to the first part,
the first part is sectionalized into a plurality of regions,
the porous part in the first part has a groove at a boundary between adjacent regions among the plurality of regions, and
the groove is provided into a part of the base material part from the porous part in a thickness direction of the anode foil.

2. The solid electrolytic capacitor element according to claim 1, wherein the first part is sectionalized into three or more regions.

3. The solid electrolytic capacitor element according to claim 1, wherein a periphery of at least one region among the plurality of regions is surrounded by the groove.

4. The solid electrolytic capacitor element according to claim 1, wherein the first part is sectionalized in a lattice shape by the groove.

5. The solid electrolytic capacitor element according to claim 1, wherein a ratio of total of a projected area of the groove to an effective area of the cathode part is in a range from 0.002% to 50%, inclusive, the projected area being an area projected to the anode body in a depth direction.

6. The solid electrolytic capacitor element according to claim 1, wherein at least a part of a region of the groove is covered with a first insulating material.

7. The solid electrolytic capacitor element according to claim 1, wherein the solid electrolyte layer is disposed in at least a part of a region of the groove.

8. The solid electrolytic capacitor element according to claim 1, wherein:
the second part includes a separation part between the anode part and the first part, and
a second insulating material is provided in at least a part of the separation part.

9. The solid electrolytic capacitor element according to claim 8, wherein the separation part includes a recess having a thickness smaller than a thickness of the first part.

10. The solid electrolytic capacitor element according to claim 1, wherein at least a part of a region from a part of the second part at a side close to the cathode part to a part of the cathode part at a side close to the second part is covered with a third insulating material.

11. A solid electrolytic capacitor comprising at least one solid electrolytic capacitor element according to claim 1.

12. A method for manufacturing a solid electrolytic capacitor element comprising:
preparing an anode body that includes a base material part, and a porous part disposed on a main surface of the base material part, the anode body including a first part that is a cathode forming part and a second part that includes at least an anode part including an end opposite to the first part;
forming a dielectric layer on at least a part of a surface of the anode body;
forming a groove in the porous part in the first part of the anode body and sectionalizing the first part into a plurality of regions; and
covering at least a part of the dielectric layer in the first part with a solid electrolyte layer, wherein the groove is formed into a part of the base material part from the porous part in a thickness direction of the anode foil.

13. The method according to claim 12, wherein, in the forming of the groove, the groove is formed by irradiating a part of the porous part with a laser beam.

* * * * *